United States Patent [19]

Ambrose

[11] 3,775,236

[45] Nov. 27, 1973

[54] RESILIENT PADDING MATERIAL

[75] Inventor: Jere B. Ambrose, Pontiac, Mich.

[73] Assignee: Northern Fibre Products Company, Birmingham, Mich.

[22] Filed: Jan. 14, 1972

[21] Appl. No.: 217,806

[52] U.S. Cl.............. 161/116, 161/123, 161/128, 161/159, 161/164, 161/190
[51] Int. Cl............................................ B32b 3/28
[58] Field of Search.................. 161/116, 123, 128, 161/159, 164, 190

[56] References Cited
UNITED STATES PATENTS

| | | | |
|---|---|---|---|
| 3,506,533 | 4/1970 | Berner | 161/123 |
| 3,463,690 | 8/1969 | Converse et al. | 156/291 |
| 3,179,551 | 4/1965 | Dudas | 161/116 |
| 3,700,539 | 10/1972 | Pufahl | 161/120 |
| 3,243,861 | 4/1966 | Kumin et al. | 28/72 |
| 3,388,028 | 6/1968 | Alexander | 161/156 |
| 3,429,219 | 2/1969 | Wood | 87/2 |
| 2,464,301 | 3/1949 | Francis | 154/46 |
| 2,373,194 | 4/1945 | Luttge | 28/78 |

Primary Examiner—George F. Lesmes
Assistant Examiner—William R. Dixon, Jr.
Attorney—Bernard J. Cantor

[57] ABSTRACT

A resilient padding material formed of a thick, resilient sheet of foam plastic having a thin backing sheet covering and adhesively laminated to one face thereof. The backing sheet is formed of a non-woven fabric made of randomly oriented, stretched fine polypropylene filaments, with the backing sheet being transversely creped by application of heat to the backing sheet prior to lamination.

3 Claims, 6 Drawing Figures

PATENTED NOV 27 1973 3,775,236

RESILIENT PADDING MATERIAL

BACKGROUND OF INVENTION

A type of padding material conventionally used for padding upholstered furniture, automotive seats and the like, is formed of a relatively thick sheet of resilient foam plastic material having laminated thereto a backing sheet. Such material is used by applying it over a seat or furniture construction and then covering it with the upholstery material to provide the softness and resiliency of the finished furniture piece.

In such type padding materials, the backing sheets are made of a cheese-cloth like, woven cotten cloth, of relatively wide weave. Such cloth is relatively firm and stiff, particularly when coated with an adhesive for application to the foam plastic. Thus, while it functions to prevent the plastic from tearing or being overstretched, it considerably reduces the resiliency, pliability, and soft feel of the padding. In addition, being moisture absorbent, the cloth tends to deteriorate, in addition to holding moisture which deteriorates adjacent furniture materials.

Hence, the invention herein relates to an improvement in such type of padding materials particularly through the use of a backing cloth-foam plastic lamination which is considerably softer, more pliable, and moisture resistant than conventional materials.

SUMMARY OF INVENTION

The invention herein relates to a resilient foam plastic-cloth backing sheet lamination, wherein the backing sheet is formed of a non-woven, randomly oriented, fabric made of stretched fine polypropylene filaments, with the sheet being transversely creped by heat application prior to lamination. The backing is rough surfaced and thus tends to interlock with the surface of the foam plastic padding, and in addition, is relatively pliable, soft, non-squeeking during distortion or bending or scraping upon adjacent surfaces, and does not absorb moisture.

The foregoing lamination is particularly adapted for use as padding material within automotive seats constructions, as well as in upholstered furniture padding and the like.

These and other objects and advantages of this invention will become apparent, upon reading the following description, of which the attached drawings form a part.

DETAILED DESCRIPTION

Figure 1:
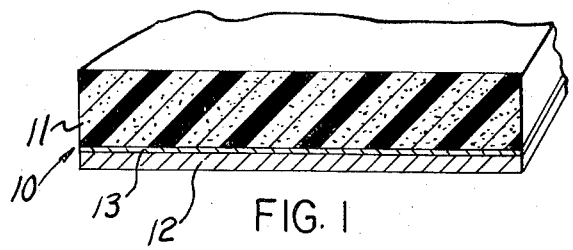
FIG. 1 is a cross-sectional, perspective view of a portion of the lamination herein.

FIG. 1 illustrates the resilient padding material 10 which is formed of a thick, resilient sheet of foam plastic 11 having a thin backing sheet 12 secured by adhesive to one face of the plastic sheet. A suitable example of the foam plastic sheet is a polyurethane foam of about one-half inch in thickness which is flexible and resilient. The specific type and thickness of the material as well as the densities and degrees of resiliency may vary, depending upon the desired use.

The backing sheet is formed of a non-woven fabric made of stretch or linearly oriented polypropylene felted in a randomly oriented fashion. The polypropylene filaments may be stretched on the order of one to four up to one to eleven, approximately, stretch ratios and then cut into relatively short lengths, such as 1 to 3 inches in length and then randomly oriented into the non-woven fabric and felted by means of a suitable binder or by heat application for heat bonding. The filament pieces are generally straight and thus extend in all directions within the plane of the cloth.

While the filaments may vary considerably in size, examples of suitable sizes would be on the order of 0.001 to 0.003 inches in diameter with the finished non-woven fabric being roughly on the order of 13 mils in thickness and about 3 ½ ounces per square yard in weight. Thus, the fabric is formed of short lengths of fine, straight, strands or filament lengths, randomly arranged in the plane of the sheet. This fabric is relatively stiff and non-stretchable and the surface filament lengths have a tendency to loosen or pill.

Figure 2:
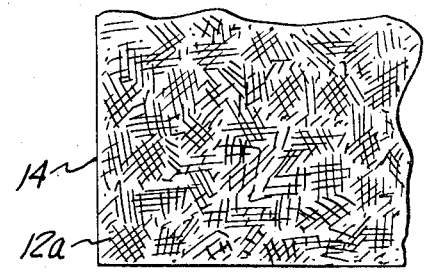
FIG. 2 is a view of the backing sheet prior to creping.

FIG. 2 illustrates the non-woven fabric 12a described above, schematically illustrating the random arrangement of the short lengths of filament.

Figure 3:
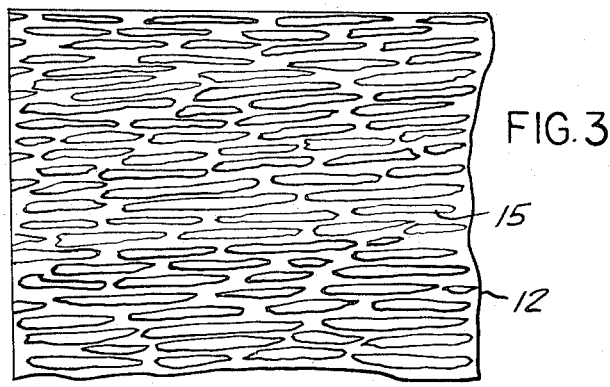
FIG. 3 is a view similar to FIG. 2, but showing the creped formations formed on the sheet.
Figure 4:
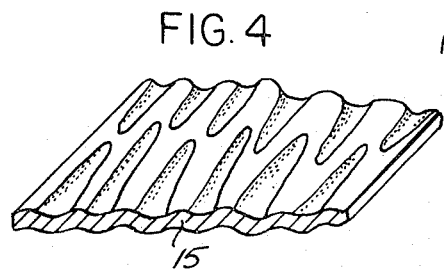
FIG. 4 is an enlarged, cross-sectional perspective view of the creped backing sheet, illustrating the lines of creping.
Figure 6:
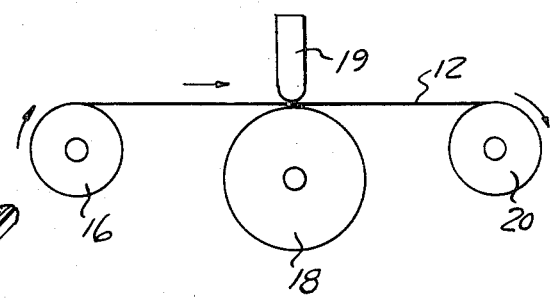
FIG. 6 is a schematic view of the creping step.

After the fabric is made, in accordance with the invention herein, it is creped into the finished fabric 12 having transverse crepe lines 15, as illustrated in FIGS. 3 and 4. Referring to FIG. 6, a roll 16 of the non-woven fabric 12a is pulled across a heated roller 18, having a blade or surface 19 above it for holding the fabric into contact with the roller and thereafter, the fabric is rewound upon a roll 20 in the form of a finished fabric 12 of FIG. 3. The heated roller 18 is heated sufficiently to heat the fabric below its melting point, to the point where the stretched filament lengths relax and begin to curl or wrinkle. Because the filament lengths are already felted together into the fabric 12a, they tend to wrinkle in creped lines 15 which extend transversely of the fabric, that is, parallel to the axis of the roller 18, with the crepe lines being in the form of low, rounded hills and low, rounded valleys or troughs, but randomly spaced apart and arranged upon the fabric. The creping being shallow does not substantially increase the thickness of the fabric, such as on the order of no more than doubling the thickness of the original fabric.

Since polypropylene melts at roughtly on the order of 340° F, the temperature of the roller 18 is kept below that point to avoid melting of the filaments.

After the sheet 12 has been heat creped, a suitable adhesive 13 may be applied to its surface and then it is adhered to a face of the foam plastic sheet 11 to form the complete lamination.

The creped sheet is rough and abrasive feeling to the touch and tends to interlock mechanically, as well as due to the adhesion, with the surface of the foam plastic material. In addition, it tends to mechanically or frictionally lock or drag upon adjacent support structures to prevent shifting of the material, as for example to avoid shifting or padding with an automobile seat.

Figure 5:
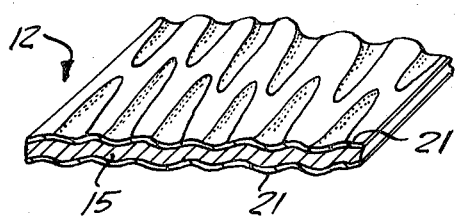
FIG. 5 is a view similar to FIG. 4, but showing a coated sheet.

For certain types of furniture or seat constructions, it is desirable to reduce the abrasiveness of the exposed creped sheet surface as well as to reduce the detachment or pilling of the thin strands from the sheet. Thus, the sheet is coated with a thin coating, such as on the order of a few mils, of a relatively smooth, slippery plastic material such as a polyethylene film. The particular film to be used may be chosen from among a wide range of those commercially available, depending upon the desired results. By coating the material with the film 21, as illustrated in FIG. 5, the mechanical interlock between the backing sheet surface and the foam plastic, while reduced to some extent, still remains effective and the exposed surface of the backing sheet will now easily slip and reduce frictional rubbing against surrounding structures.

The invention herein may be further developed within the scope of the following claims.

Having fully described an operative embodiment of this invention, I now claim:

1. A resilient padding material comprising a relatively thick, resilient, flexible foam plastic sheet, and a thin, cloth-like backing sheet completely covering and adhesively laminated to one face of the plastic sheet;

said backing sheet being formed of a non-woven fabric made of felted together short strands or stretch oriented polypropylene filament, randomly oriented in the plane of the sheet;

and said backing sheet being creped into randomly spaced apart, elongated, rounded low hills and shallow valleys extending generally transversely of the width direction of the backing sheet, with said creping being characterized by being formed by momentarily heating the sheet sufficiently to relax the stretched strands and cause them to wrinkle into the form of the creped hills and valleys;

wherein the laminated padding material is soft, pliable and resiliently stretchable and distortable and tear and moisture resistant.

2. A padding as defined in claim 1, and said creped backing sheet being characterized by being abrasive and rough surfaced for thereby interlocking with the structure of the covered surface of the foam plastic sheet.

3. A padding as defined in claim 1, and the surfaces of said backing sheet being coated with a thin, slippery surfaced plastic film, such as of a smooth, slippery polyethylene.

* * * * *